United States Patent [19]
Morse

[11] 3,745,323
[45] July 10, 1973

[54] ADAPTOR FOR VARIABLE OUTPUT PHOTOFLASH APPARATUS

[75] Inventor: John B. Morse, Cambridge, Mass.

[73] Assignee: Polaroid Corporation, Cambridge, Mass.

[22] Filed: May 6, 1971

[21] Appl. No.: 140,890

[52] U.S. Cl. .............................. 240/1.3, 95/11.5 R
[51] Int. Cl. ............................................ G03b 15/03
[58] Field of Search ............................ 240/1.3:2 C; 95/11.5 R

[56] References Cited
UNITED STATES PATENTS

| | | | |
|---|---|---|---|
| 3,296,947 | 1/1967 | Engelsmann et al. | 95/11.5 R X |
| 3,369,467 | 2/1968 | Land | 240/1.3 X |
| 3,390,621 | 7/1968 | Land | 240/1.3 X |
| 3,491,667 | 1/1970 | Land | 95/11 R |
| 3,517,196 | 6/1970 | Owens | 240/1.3 X |

OTHER PUBLICATIONS

Stump, G. P. Light Control for Electronic Flash Unit IBM Tech. Disclosure Bull. Vol. 8, No. 6, p. 876, Nov. 1965.

*Primary Examiner*—Richard C. Queisser
*Assistant Examiner*—Joseph W. Roskos
*Attorney*—Brown and Mikulka and Michael Bard

[57] ABSTRACT

A variable output photoflash unit structured to be installed on and mechanically coupled to a particular line of commercial photographic cameras for automatic "follow-focus" control of its output, and an adaptor for adapting the photoflash unit for use with any camera having flash capability. The photoflash unit receives a multi-lamp photoflash assembly of the "flash cube" type and has adjustable attenuating means effective to attenuate a variable fraction of the luminous energy produced by the flash lamps in the assembly dependent upon the input received by a sensing probe. The adaptor accommodates the sensing probe and provides for manual selection of different levels of light output from the flash unit according to and in terms of the range of objects to be photographed.

18 Claims, 13 Drawing Figures

Patented July 10, 1973
3,745,323
5 Sheets-Sheet 3
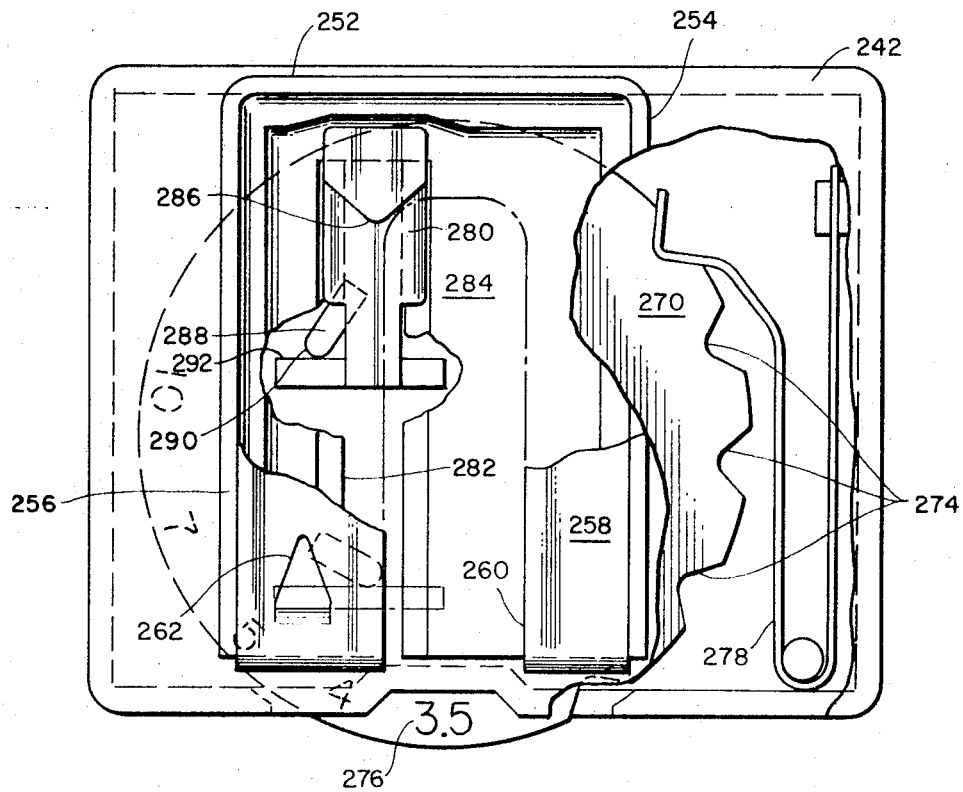
FIG. 3
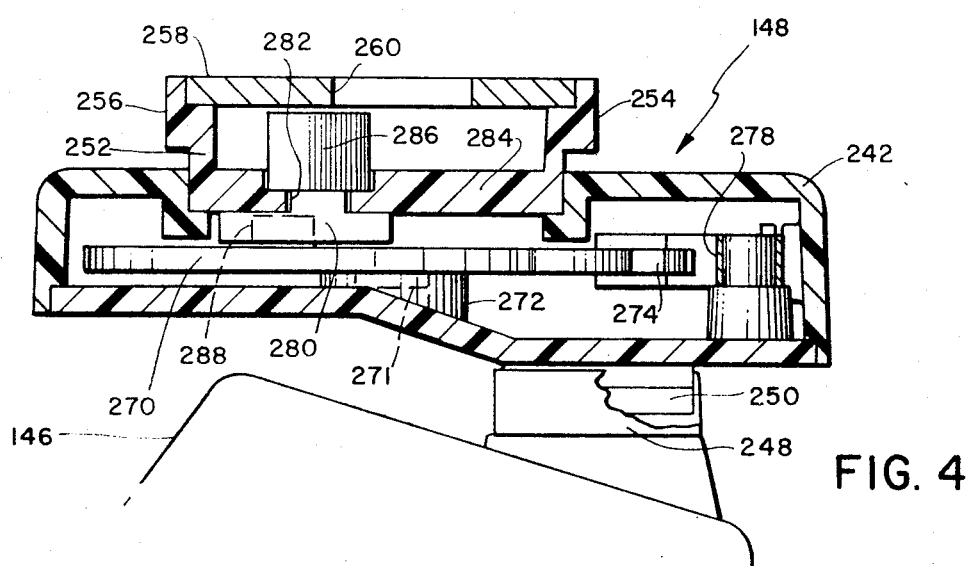
FIG. 4
| ASA | 32 | 64 | 80 | 100 | 125 | 160 | 400 |
|---|---|---|---|---|---|---|---|
| f# | 5.7 | 8.1 | 9.1 | 10.2 | 11.4 | 12.8 | 20.3 |
FIG. 9
SHUTTER SPEED – 1/25 SEC.
INVENTOR
JOHN B. MORSE
BY Brown and Mikulka
and
John H. Coult
ATTORNEYS 3,745,323
Patented July 10, 1973
5 Sheets-Sheet 4
FIG. 5
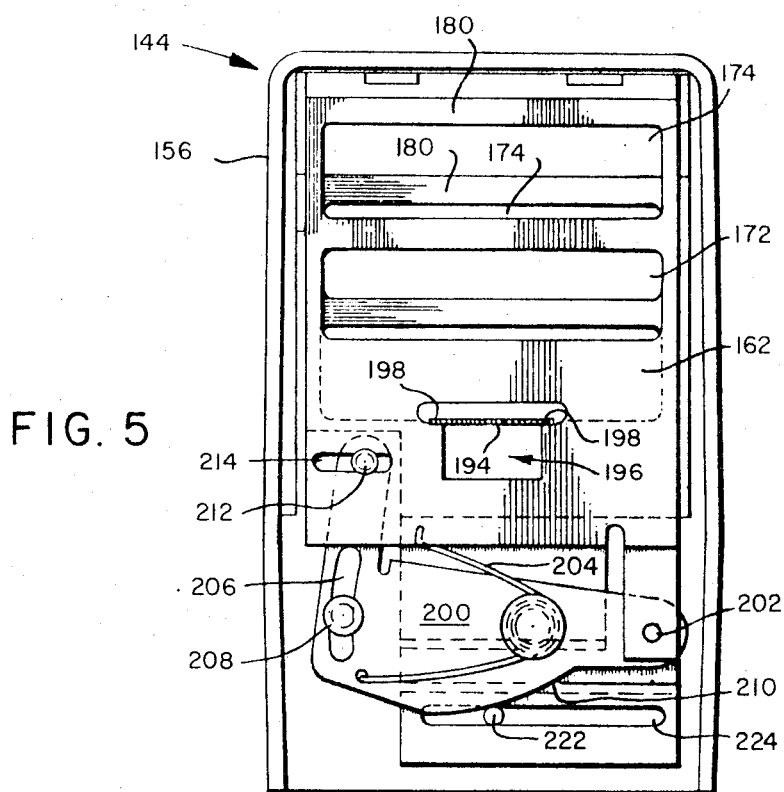
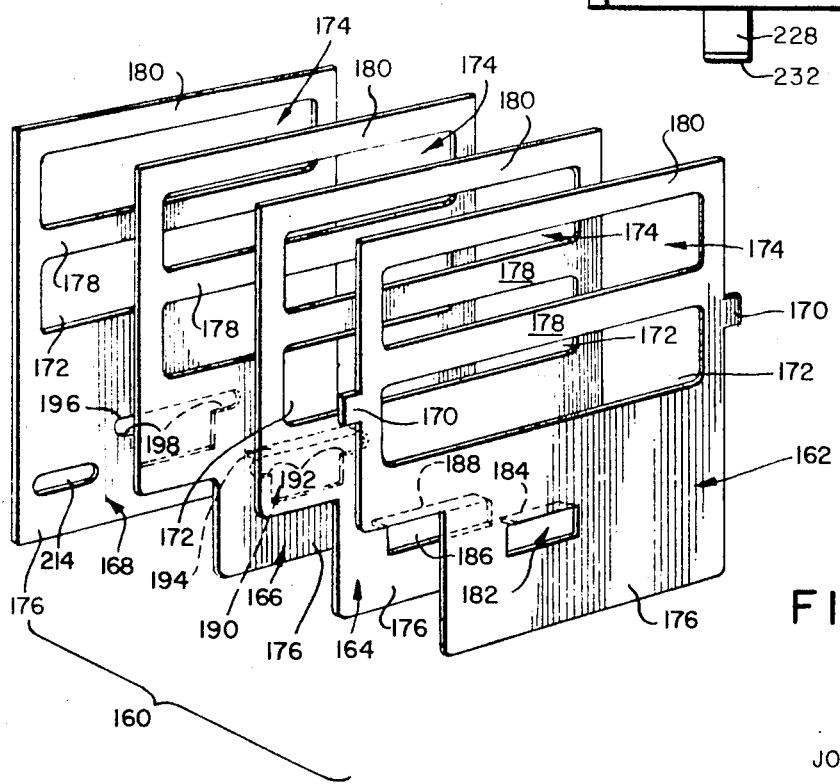
FIG. 6
INVENTOR
JOHN B. MORSE
BY Brown and Mikulka
and
John H. Coult
ATTORNEYS INVENTOR
JOHN B. MORSE
BY Brown and Mikulka
and
John H. Coult
ATTORNEYS

ADAPTOR FOR VARIABLE OUTPUT PHOTOFLASH APPARATUS

BACKGROUND OF THE INVENTION

The difficulties encountered in attempting to produce proper flash illumination of photographed subjects at all object distances are well known. Stroboscopic flash units are offered commercially which are adjustable to vary the luminous output thereof. Such units are priced beyond the reach of a great many photographers, and even at their relatively high price are quite inconvenient, complex, and time-consuming in use. Typically, operating instructions for such stroboscopic flash units require: 1) that the associated camera be focused; 2) that the correct aperture of the camera's objective be ascertained for a given film sensitivity, focused distance, and shutter speed (normally by the use of a table provided); and 3) that upon obtaining the necessary information, the aperture of the camera objective be set accordingly. This procedure must be repeated each time a flash exposure is to be made at a different focused distance. The inconvenience of this procedure is manifest.

A low-cost variable output photoflash unit has recently been introduced by the assignee of this invention which is intended for use on certain of its commercial cameras. The flash unit is automatically adjusted in its light output to follow the focused distance of the associated camera—the greater the focused distance, the greater the luminous output of the unit, up to a maximum level of light output determined by the rating of the flash lamps employed. This flash unit is priced within reach of the photographic mass market and is designed to use the popular "flash cube" multi-lamp flash assembly. However, because the flash unit is designed to be installed on and mechanically coupled to certain mating cameras exclusively for use in a "follow-focus" mode of operation, this flash unit has not, prior to this invention, been available to the very large numbers of photographers possessing non-compatible cameras.

OBJECTS OF THE INVENTION

It is a general object of this invention to provide manually adjustable variable output photoflash apparatus which is capable of use with substantially all photographic cameras having flash capability, and yet which is relatively inexpensive and extremely convenient to use.

It is another object of this invention to provide a low-cost, compact, and very simple adaptor for adapting for general use a commercial, low-cost variable output flash unit which is structured for coupled "follow-focus" operation on certain commercial cameras only.

It is still another object that such adaptor make possible manually variable flash illumination of objects at various ranges in accordance with the focused distance of an associated camera, and that such manual follow-focus operation is easy and convenient for the user.

It is another object to provide such an adaptor which simulates with low cost and simple structure the non-linear flash control characteristics of the said certain commercial cameras with which the flash unit is structured for use.

It is still another object to provide improved methods of flash photography.

Further objects and advantages of the invention will in part be obvious and will in part become apparent as the following description proceeds. The features of novelty which characterize the invention will be pointed out with particularity in the claims annexed to and forming a part of this specification.

DESCRIPTION OF THE DRAWINGS

FIG. 3 is a plan view, partly broken away, of the adaptor shown in the above-described figures;

FIG. 4 is a side sectional view of the adaptor;

FIG. 5 is a front elevational view of the photoflash unit shown in the above-described figures with front structure removed to show otherwise hidden components;

FIG. 6 is an exploded view of an array of apertured plates comprising part of the photoflash unit;

FIG. 9 is a guide table for assisting in practicing a novel method of flash photography according to this invention.

DESCRIPTION OF THE PREFERRED EMBODIMENTS

Figure 1:
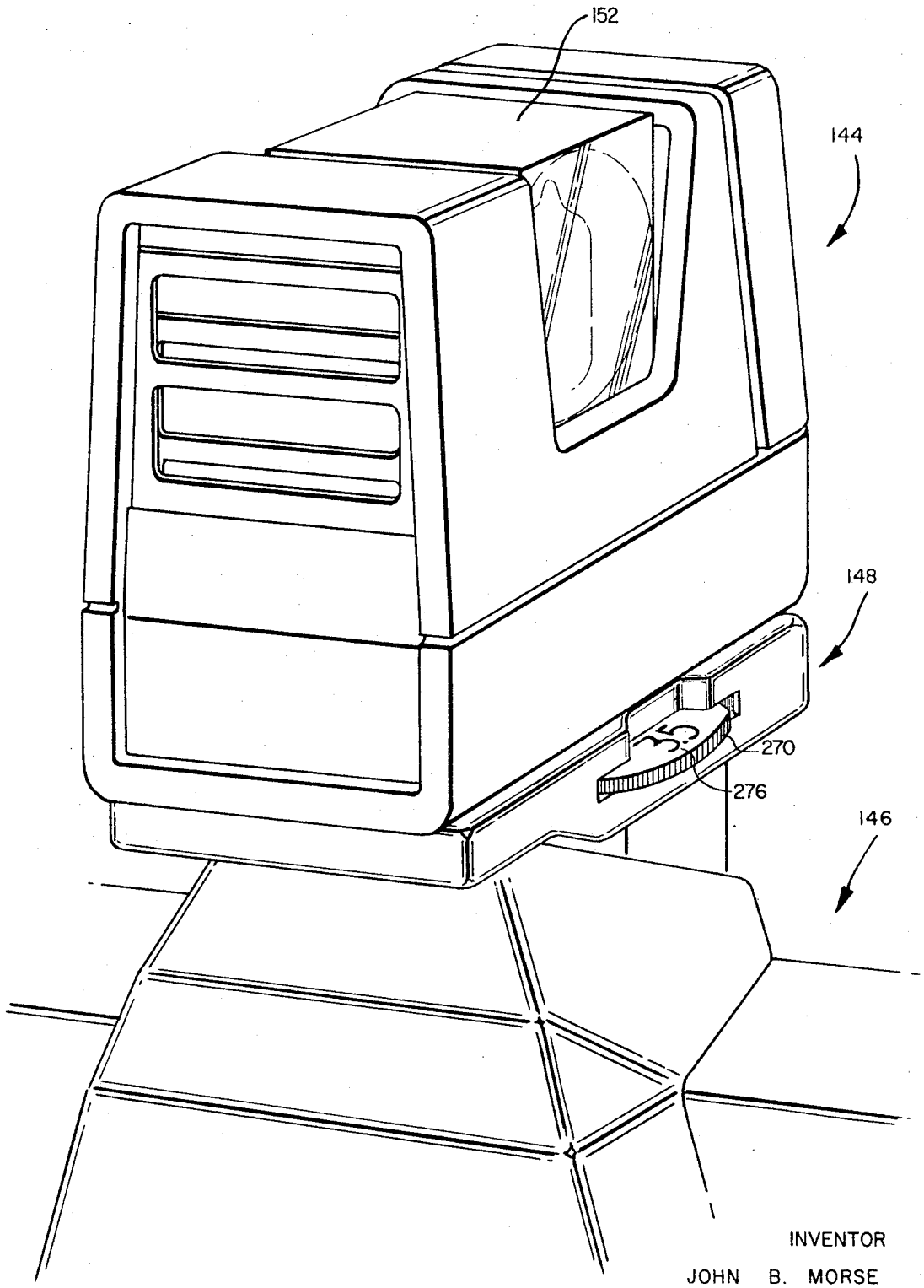
FIG. 1 is a perspective of a photographic camera having operatively mounted thereon variable output photoflash apparatus.
Figure 2:
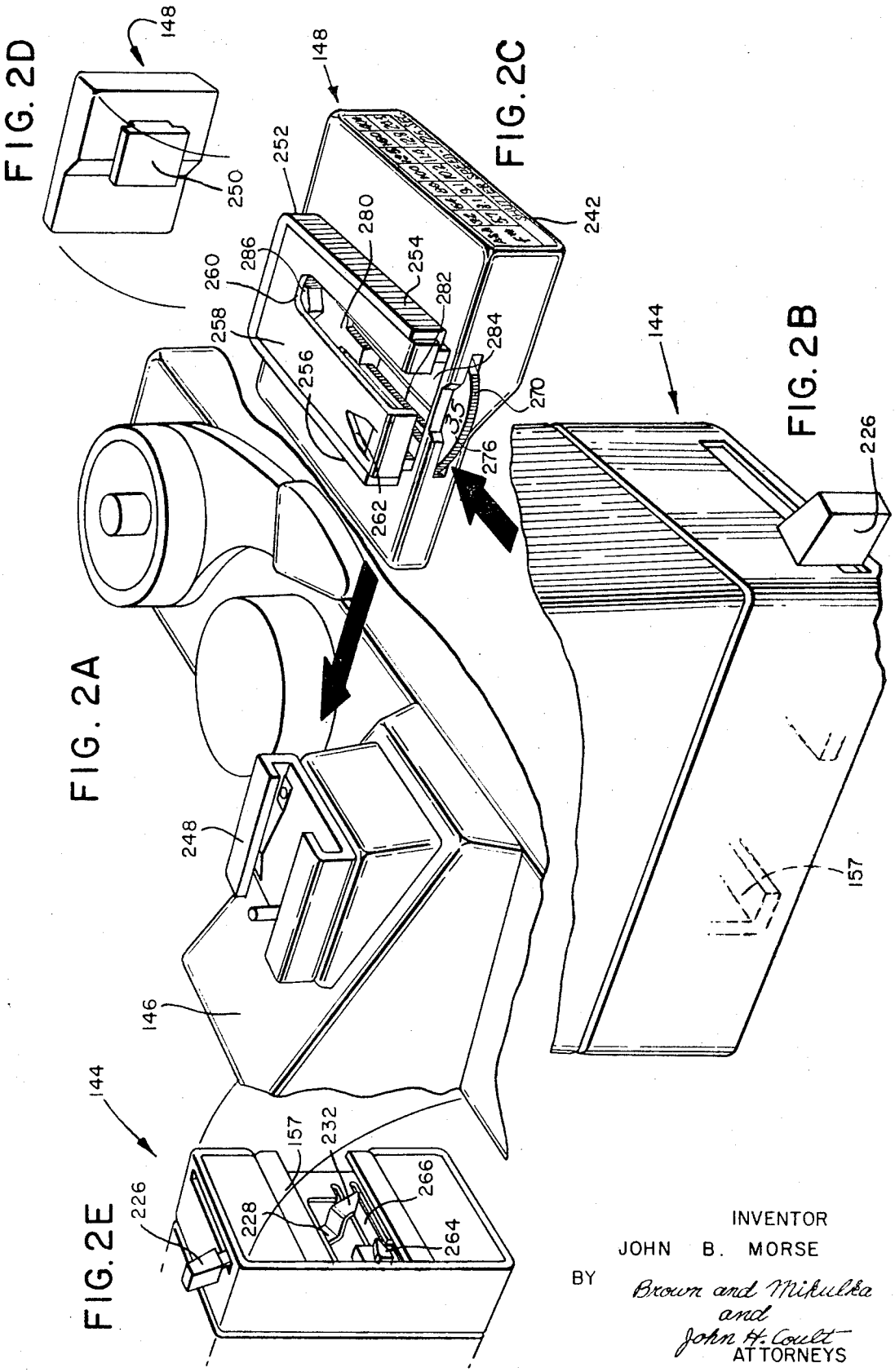
FIG. 2A is a fragmentary rear perspective of a photographic camera having a universal flash bracket.
FIG. 2B is a fragmentary perspective of a commercially available variable output photoflash unit.
FIG. 2C is a perspective of an adaptor according to this invention for adapting the FIG. 2B photoflash unit for general use with cameras such as the camera shown in FIG. 2A and FIG. 1.
FIG. 2D is a bottom perspective of the adaptor shown in FIG. 2C as it might appear if rotated 90° from its FIG. 2C position.
FIG. 2E is a bottom perspective of the photoflash unit shown in FIG. 2B as it might appear if rotated 90° from its FIG. 2B position.

FIG. 1 shows a commercial flash unit 144 mounted for use on a camera 146 (here shown as being of the 35mm type) by means of a novel adaptor 148 representing one of the many possible implementations of this invention. An understanding of the structure and operation of the adaptor 148 will be expedited if the photoflash unit 144 which is being adapted for general applicability is first described (see FIGS. 5 - 8).

The photoflash unit 144 is illustrated as including socket means, shown schematically at 150 (FIG. 7), for receiving a flash lamp assembly 152, known commercially as a "flash cube." The assembly 152 contains four individual flash lamps, one of which is shown schematically at 154 and four associated reflectors, one of which is shown schematically at 155. The flash lamps 154 are preferably of a commercially available high output type. Each of the lamps 154 is capable of producing when ignited, a burst of luminous energy of predetermined high intensity and fixed duration. The photoflash unit 144 includes a stationary frame member 156 to which is affixed an attachment assembly 157. A clear plastic cover assembly 158 is secured to the stationary frame member 156.

The photoflash unit 144 includes attenuating means for attenuating a variable fraction of the luminous output of an ignited lamp, comprising an array 160 of apertured plates disposed within the cover assembly 158. The array 160 comprises four apertured plates 162, 164, 166, and 168 disposed in overlying relationship (see FIGS. 5 and 6).

The apertured plate 162 is fixedly mounted within the cover assembly 158 and is provided with a pair of oppositely directed ears 170 which function to secure the plate 162 within the cover assembly 158. The apertured plates 164, 166, and 168 are disposed successively rearwardly of the fixed apertured plate 162 and are each slideable within the cover assembly 158 relative to one another and to the fixed apertured plate 162.

Each of the apertured plates 162, 164, 166, 168 defines a similar pair of spaced and generally rectangular apertures 172, 174. The pair of apertures 172, 174 are so disposed as to establish in each plate a lower portion 176, a central portion 178, and an upper portion 180.

The lower portion 176 of the plate 162 is provided with a generally rectangular opening 182 having an inwardly directed tab 184 extending from the upper longitudinal edge thereof. Similarly, the plate 164 is provided with a generally rectangular opening 186 having an inwardly directed tab 188 extending from the upper longitudinal edge thereof.

The plate 166 includes a generally T-shape opening 190 in the lower portion 176 thereof which is so configured as to define a pair of inwardly extending shoulders 192. The T-shape opening 190 includes an inwardly directed tab 194 extending from the uppermost edge thereof. Similarly, the apertured plate 168 is provided with a T-shape opening 196 in the lower portion 176 thereof which is so configured as to define a pair of inwardly extending shoulders 198.

The longitudinal extent of the openings 182 and 186 and the distance between the inwardly extending shoulders 192 and 198 progressively increases from the plate 162 to the plate 168. Also, the width (in the direction of the longitudinal extent of the openings 182 and 186) of the inwardly directed tabs 184, 188, and 194, respectively, progressively increases in correspondence to the increase in the width of the openings 182, 186, and the distance between the inwardly extending shoulder 192, 198.

In operation, upward movement of the plate 168 causes the tab 194 on the plate 166 to engage the shoulders 198 on plate 168 whereupon the plate 166 is picked up and caused to move along with the plate 168.

Continued upward movement of the plates 166, 168 causes the tab 188 on the plate 164 to engage the pair of shoulders 192 on plate 166 whereupon the plate 164 is caused to move upwardly with the plate 166.

Further upward movement of the apertured plates 168, 166, and 164 brings the tab 184 on the plate 162 into engagement with the fixed lower edge of the rectangular opening 186, precluding further upward movement of the plates 168, 166, and 164. In this position the array 160 of plates is in its position of least effective open area and thus of maximum attenuation.

Downward movement of the apertured plate 168 successively causes the tab 194 to engage the uppermost edge of the T-shape opening 196, and the tab 188 to engage the uppermost edge of the T-shape opening 190, whereby the plates 166 and 164 follow the downward movement of the apertured plate 168 until such time as the tab 184 engages the uppermost edge of the opening 186 in the plate 164.

Actuating means are provided for adjusting the effective open area of the array 160 of plates and thus the light attenuation produced by the attenuating means. In the illustrated embodiment, the actuating means includes a lever arm 200 pivotally secured to the frame member 156 by a pin 202. The lever arm 200 is biased counterclockwise (in FIG. 5) about the pin 202 by a torsion spring 204. The lever arm 200 defines an arcuate slot 206 adapted to receive a guide pin 208 which is affixed to the frame member 156 and which functions to guide the pivotal movement of the lever arm 200 about the pin 202.

A portion of the lower edge of the lever arm 200 is provided with a cam surface 210 and one end portion of the lever arm 200 is provided with a pin member 212 which is rotatably and slideably received within a slot 214 in the rearmost apertured plate 168.

A link arm 216 is pivotally secured to the frame member 156 by a pin 218 for pivotal movement in a plane normal to the plane of the array 160 of apertured plates. The link arm 216 is biased for clockwise movement by a tension spring 220, one end of which is secured to the frame member 156 and the other end of which is secured to one end portion of the link arm 216.

The link arm 216 has a generally cylindrical end portion 222 which extends through a slot 224 in the front portion of the frame member 156. The slot 224 extends laterally across the front portion of the stationary frame member 156 whereby the cylindrical end portion 222 may traverse said slot 224 in response to pivotal movement of said link arm 216. The cylindrical end portion 222 of the link arm 216 is maintained in engagement with the cam surface 210 of the lever arm 200 due to the biasing of said lever arm 200 by said torsion spring 204 and the link 216 by spring 220, as aforesaid.

A trim mechanism provides for fine adjustments in the light attenuation program of the attenuating means. The trim mechanism is shown as including a trim control link 226 pivotally secured by pin 218 to the frame member 156 beneath the link arm 216 and at the pivotal center thereof. A driving link 228 is pivotally secured to the trim control link 226 outwardly of the pin 218 by a pin 230. The link 228 functions as a sensing probe for the photoflash unit 144, as explained in more detail below.

The driving link 228 extends beneath the front portion of the photoflash unit 144 to an end portion 232. An end portion of the driving link 228 remote from said L-shape end portion 232 defines a bearing surface 236 which extends beneath and normal to the plane of rotation of the driving link 228. An end portion of the link arm 216 remote from the cylindrical end portion 222 terminates in a bearing surface 238 which depends therefrom generally normal to the plane of rotation of the link arm 216.

An adjustment screw 240 is received in a threaded opening in the surface 238 such that the portion of the adjustment screw 240 extending outwardly of the surface 238 may be varied as desired. The adjustment screw 240 serves to space the surface 236 a predetermined distance from the surface 238 such that movement of the driving link 228 a predetermined amount will cause the cylindrical end portion 222 of the link arm 216 to move to a predetermined position dependent upon both the amount of movement of the driving link 228 and the setting of the adjustment screw 240.

The link arm 216 is caused to follow the driving link 228 because of the bias exerted on said link arm 216 by the tension spring 220. Also, movement of the trim control link 226 causes the driving link 228 to pivot with the trim control link 226 about the pin 218 thereby moving the bearing surface 236 away from the bearing surface 238. The tension spring 220, however, causes the adjustment screw 240 to remain in contact with the surface 236 and the end portion 222 will be adjusted a predetermined amount by the movement of said trim control link 226, as aforesaid.

As suggested above, the driving link 228 acts as a mechanical sensing probe for the photoflash unit 144. The mechanical input to link 228 determines the state of the actuating means for the array 160 of plates performing the variable attenuation function for the unit 144.

An input (a mechanical displacement) to the link 228 causes the link 228 to pivot about pin 230, driving link arm 216 and, consequently, lever arm 200 to produce an adjustment in the relative positions of the apertured plates 162, 164, 166, and 168 and thus an adjustment in the effective open area defined thereby. It is evident from the above description that counterclockwise (in FIG. 8) displacement of link 228 causes the array 160 of plates to move downwardly and open, increasing the luminous output of the unit 144 when a flash lamp 154 is ignited.

Thus, as will be described more fully below, counterclockwise movements of the link 228 are necessarily associated with flash illumination of objects at greater focused distances. Conversely, clockwise movements of the link 228, which result in larger fractions of the output of the lamps 154 being attenuated, are associated with flash illumination of objects at decreased range.

Figure 8:
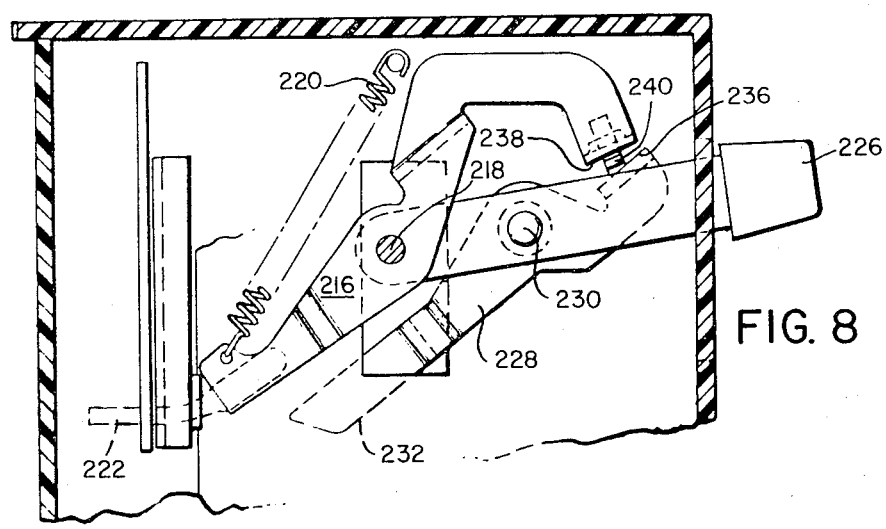
FIG. 8 is a side sectional view of the photoflash unit taken along lines 8—8 in FIG. 7.
Figure 7:
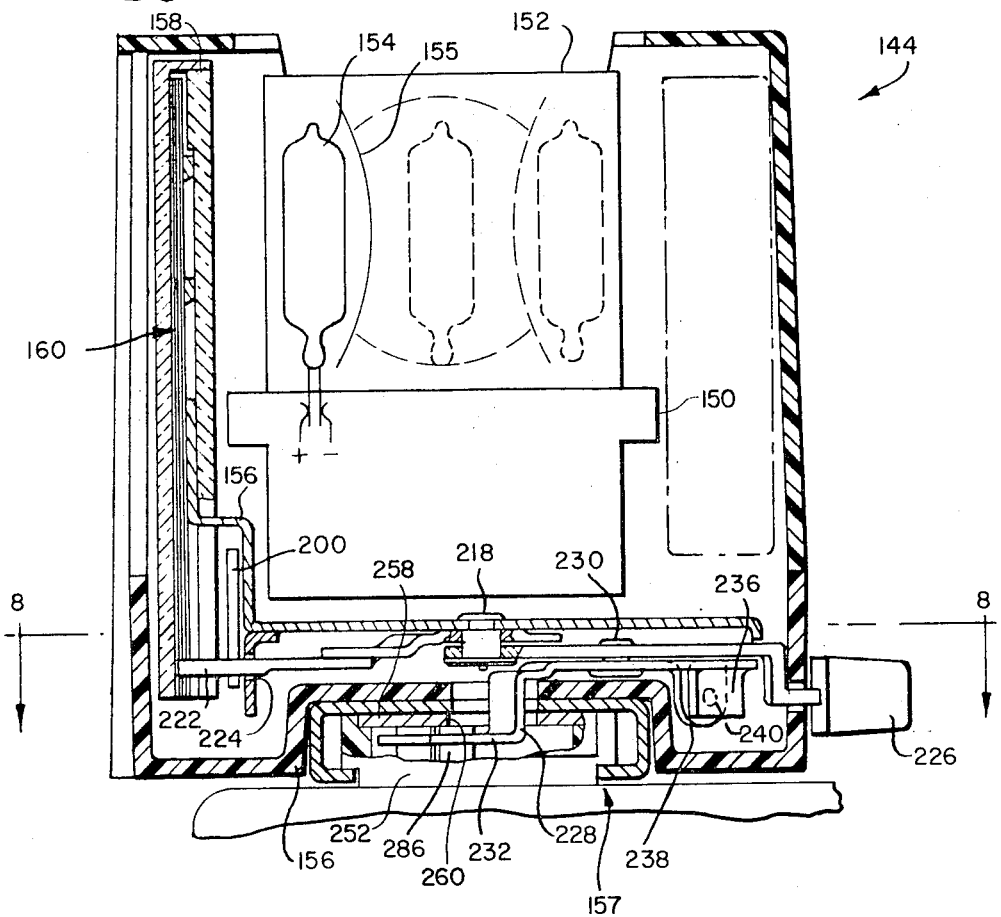
FIG. 7 is a fragmentary sectional view illustrating a trim assembly for making fine adjustments in the luminous output of the photoflash unit.

It should be understood that for any particular input to the link 228, the effective attenuation provided by the array 160 of apertured plates may be selectively increased or decreased by adjustment of the trim control link 226. For example, clockwise rotation of the trim control link 226, as seen in FIG. 8, will cause the array 160 of plates to close so as to decrease the effective amount of light which will reach the subject when a flash lamp is ignited.

One aspect of this invention is directed to the provision of an adaptor 148 (FIGS. 1 - 4) which frees the photoflash unit 144 from its operational dependency on a particular photographic camera or line of cameras, and enables the unit 144 to be used as a self-contained, manually operable, variable output photoflash unit with any camera having flash capability. See especially FIGS. 2A - 2E, 3, and 4.

For a more detailed description of the photoflash unit 144, reference may be had to copending application, Ser. No. 101,336, filed Dec. 24, 1970, and commonly assigned herewith to Polaroid Corporation.

The adaptor 148 is illustrated as comprising support means including a housing 242, first mechanical interfacing means for connecting the adaptor 148 to a flash bracket 248 on a camera 146, and second mechanical interfacing means for connecting the photoflash unit 144 to the adaptor 148. The first mechanical interfacing means is shown as comprising a foot 250 which is slideably received in and held by bracket (shoe) 248. The flash bracket 248 and foot 250 are shown as being of a universal type in widespread use on hand-held photographic equipment.

The second mechanical interfacing means for connecting the unit 144 to the adaptor 148 is illustrated as including a foot-like connector 252 with flanges 254 and 256 which is received in the attachment assembly (shoe) 157. The connector 252 has formed on its inner periphery a ledge which supports a metal plate 258 having a centrally located slot 260 for permitting entry into the adaptor 148 of the end 232 of link 228 on the photoflash unit 144 when the unit 144 is connected to the adaptor 148.

A triangular-shape aperture 262 in the plate 258 is positioned to receive a projection 264 on the end of a spring arm 266 comprising part of the attachment assembly 157 on the photoflash unit 144. The projection 264 snaps into the aperture 262 when the photoflash unit 144 is operatively connected to the adaptor 148, signaling a proper connection of the photoflash unit 144 and precluding inadvertent disengagement of the unit 144 from the adaptor 148.

The adaptor 148 includes novel manually adjustable means for driving the link 228 on the photoflash unit 144 to vary the level of light output from the photoflash unit 144 when a lamp 154 is ignited. The manually adjustable means includes an operator in the form of a wheel 270 and coupling means for mechanically coupling the wheel 270 and the driving link 228 on the photoflash unit 144 such that the unit 144 is enabled to produce a level of light output which is responsive to the setting of the wheel 270.

The wheel 270 is illustrated as having a stub axle 271 which is received for rotation within a hollow cylindrical bearing 272. The wheel 270 carries range indicia 276 indicating different levels of flash intensity in terms of distance to a scene object to be illuminated. The general utility of the adaptor 148 and the usefulness of the range indicia 276 will be described in more detail below in connection with a description of an improved method of flash photography which may be practiced using the teachings and structures of this invention.

The adaptor 148 includes indexing means for retaining the wheel 270 in predetermined angular positions corresponding to pre-established levels of luminous output of the unit 144. As revealed by the range indicia 276, the indexing means acts to locate the wheel 270 in positions, hereinafter termed "index positions," appropriate for flash exposures at focused distances of, for example, 3.5, 4, 5, 7, and 10 feet.

The indexing means includes a plurality of angularly spaced recesses 274 spaced on the periphery of the wheel 270 at locations corresponding to the predetermined index positions of the wheel 270. Spring detent means comprising a leaf spring 278 retentively engages the recesses 274 in the wheel 270 one at a time to hold the wheel 270 in a selected one of its index positions.

The coupling means for coupling the operator wheel 270 to the driving link 228 includes a rotary-to-linear motion conversion mechanism responsive to rotation of wheel 270 for driving link 228, comprising a slider 280 which is supported for linear reciprocatory movement in a slot 282 in a wall member 284 comprising part of the support means for the adaptor 148. The slider 280 has a nose 286 which engages the end 232 of the link 228 on the photoflash unit 144 and is maintained in engagement therewith by the spring bias provided by spring 220, described above.

The rotary-to-linear motion conversion mechanism includes an axial projection 288 on a face of the wheel 270 which engages and drives the slider 280. The projection 288 is located a predetermined radial distance from the rotational axis of the wheel 270 and has a rounded end 290 which engages the slider 280. FIG. 3 shows the wheel and slider set for exposure of a scene object at close range, shown as 3.5 feet. A second position which the wheel 270 and slider 280 may assume when set for exposure of an object near the far limit of the range for the flash unit 144 (e.g., 10 feet), is illustrated in broken lines in FIG. 3. It can be understood from FIG. 3 that as the wheel 270 is rotated, the end 290 of the projection 288 traverses the contacted face 292 of the slider 280 with a wiping action.

Referring to the actuating means for controlling the light attenuating means (the array 160 of plates) in the photoflash unit 144 (see FIGS. 5 – 8)—it is important to understand that the displacement of the driving link 228 for a given change in effective luminous output from the unit 144 is a highly non-linear function. More specifically, as the link 228 is moved toward its far limit position (counterclockwise in FIG. 8), corresponding to maximum light output from the unit; e.g., ever-decreasing increments of displacement of the link 228 are required to produce equal changes in the effective luminous output of the unit 144.

The rotary-to-linear motion conversion mechanism according to this invention produces a compensating non-linear displacement of the driving link 228. This is achieved by causing the wheel 270 to move through an angular locus of travel of predetermined extent and placement which is such that, due to the action of the projection 288 on the slider 280, the linear displacement of the slider 280 is related to angular displacement of the wheel 270 by substantially a cosine function. A cosine function has been found to approximate satisfactorily the non-linear displacement function of the link 228. It is manifest that this compensating rotary-to-linear motion conversion is provided according to this invention by a structure which is extremely inexpensive to manufacture and simple in construction and operation.

It should be understood at this point that the cam surface 210 of the lever arm 200 is of such shape, and the various components of the photoflash unit 144 and adaptor 148 are so constructed and arranged that the net attenuation effected by the array 160 of plates in response to adjustment of the wheel 270 provides appropriate illumination for an object to be photographed as a function of the range thereof.

As described in the introduction to this specification, the practice of flash photography has been obstructed by the difficulty in obtaining appropriate film exposures for objects at all ranges within the operating limits of the photoflash unit utilized. As noted, even variable output stroboscopic flash units which are offered commercially at high cost are inconvenient to use, requiring quite complex operations prior to each flash exposure which is to be made at a different range.

By the teachings of this invention, a novel and improved method of flash photography may be practiced. Using a photographic camera, as shown for example at 146, having a photoflash unit 144 mounted for operation by the use of the novel adaptor 148, the user first sets an exposure value in the camera appropriate for the sensitivity of the photosensitive materials being used in the camera. A guide table such as is shown in FIG. 9 is preferably provided to assist in the performance of this step. The user can then make a series of flash exposures of objects at different ranges merely by focusing the camera on the object to be photographed, ascertaining the range of the object focused on, and manually setting the wheel 270 to correspond to the ascertained range of the subject. The camera is then ready for triggering of the photoflash unit and camera exposure apparatus to expose the photosensitive materials. Thus, by following the teachings of this invention, flash photography may be practiced with consistent and predictable results and with very little effort and experience required. It has been found that the transfer of footage reading from the focus adjustment mechanism of a camera to the wheel 270 is made with extreme ease since the transfer is unencumbered by any requirement to make a conversion (or conversions) to another factor or unit.

The invention is not limited to the particular details of construction of the embodiments depicted, and it is contemplated that various and other modifications and applications will occur to those skilled in the art. For example, manually operable structures other than those illustrated for providing manual control of the effective output from the photoflash unit 144 are contemplated by this invention. The indicia on the operator (or associated therewith) may represent different levels of effective light output in terms other than object distances; however, for the reasons described above, the indicia is preferably in terms of focused distances. The operator indexing means and mechanical interfacing structures are disclosed as but one of numerous possible implementations of the principles of this invention.

Therefore, because certain changes may be made in the above-described apparatus without departing from the true spirit and scope of the invention herein involved, it is intended that the subject matter of the above depiction shall be interpreted as illustrative and not in a limiting sense.

What is claimed is:

1. An adaptor, for adapting a variable output photoflash unit having mechanical sensing means for controlling said variable output, said adaptor capable of use with a photographic camera having a universal flash unit bracket, comprising:

support means including first and second mechanical interfacing means for connecting, respectively, said adaptor to a universal flash unit bracket on a camera and the photoflash unit to said adaptor;

a manually adjustable operator for selectively varying the level of light output from the photoflash unit; and coupling means for mechanically coupling said operator and the sensing means on the photoflash unit such that the photoflash unit is enabled to produce a level of light output when energized which is responsive to the setting of said operator.

2. The adaptor defined by claim 1, wherein said operator comprises a manually rotatable wheel and wherein said coupling means includes a rotary-to-linear motion conversion mechanism responsive to rotation of said wheel for driving the sensing means on the flash unit.

3. The adaptor defined by claim 2, including means to mount said wheel to rotate about an axis substantially orthogonal to a principal direction of light propagation from the photoflash unit when connected to said adaptor, and wherein said rotary-to-linear motion conversion mechanism includes a slider which is supported for linear reciprocatory movement in engagement with the sensing means on the photoflash unit, said wheel having a projection which engages and drives said slider.

4. The adaptor defined by claim 3, wherein said projection acts on said slider such that the linear displacement of said slider is related to angular displacement of said wheel by substantially a cosine function.

5. The adaptor defined by claim 2, wherein said wheel carries footage indicia indicating different levels of flash intensity in terms of distance to a scene object to be illuminated.

6. The adaptor defined by claim 2, wherein said wheel defines a plurality of radially spaced recesses denoting predetermined index positions of said wheel, and wherein said adaptor includes spring detent means for retentively engaging said recesses one at a time to hold said wheel in a selected one of said index positions.

7. For use with a photographic camera, the combination comprising:
a manually adjustable variable output photoflash unit, comprising:
socket means for receiving a flash lamp assembly containing a plurality of individual flash lamps and associated reflectors, each lamp being capable of producing, when ignited, a burst of luminous energy of predetermined fixed intensity and duration, and
adjustable attenuating means for attenuating a variable fraction of the luminous output of an ignited lamp comprising a plurality of apertured plates mounted for relative translational movement so as to vary the effective open area thereof, said attenuating means including actuating means for effecting said relative movement of said apertured plates and a sensing probe for controlling said actuating mechanism; and
an adaptor for adapting said variable output photoflash unit for use with a photographic camera having a universal flash unit bracket, comprising:
support means including first and second mechanical interfacing means for connecting, respectively, said adaptor to a universal flash unit bracket on a camera and said photoflash unit to said adaptor,
a manually adjustable operator for selectively varying the level of light output from said photoflash unit, and
coupling means for mechanically coupling said operator and said sensing probe on said photoflash unit such that said photoflash unit is enabled to produce a level of light output when energized which is responsive to the setting of said operator.

8. The apparatus defined by claim 7, wherein said operator comprises a manually rotatable wheel and wherein said coupling means includes a rotary-to-linear motion conversion mechanism responsive to rotation of said wheel for driving the sensing probe on the flash unit.

9. The apparatus defined by claim 8 including means for mounting said wheel to rotate about an axis substantially orthogonal to the principal direction of light propagation from said photoflash unit, and wherein said rotary-to-linear motion conversion mechanism includes a slider which is supported for linear reciprocatory movement in engagement with said probe, said wheel having a projection on one face thereof which engages and drives said slider.

10. The apparatus defined by claim 9, wherein said projection acts on said slider such that the linear displacement of said slider is related to angular displacement of said wheel by substantially a cosine function.

11. The apparatus defined by claim 10, wherein said wheel carries footage indicia indicating different levels of flash intensity in terms of distance to a scene object to be illuminated.

12. The apparatus defined by claim 11, wherein said wheel defines a plurality of radially spaced recesses denoting predetermined index positions of said wheel, and wherein said apparatus includes spring detent means for retentively engaging said recesses one at a time to hold said wheel in a selected one of said index positions.

13. A device for varying the effective light output from a flash lamp having when ignited a luminous output of predetermined fixed duration and intensity, comprising:
support structure including flash housing means;
socket means within said housing for receiving a flash lamp including means for applying energy to ignite the lamp;
adjustable attenuating means within said housing means for attenuating a variable fraction of the light produced by the lamp when ignited, said attenuating means having a sensing probe which is movable to vary said fraction of light attenuated; and
a manually rotatable operator carried by said support structure which is coupled to said sensing probe of said attenuating means through rotary-to-linear motion converting means for selectively varying the level of effective light output from the lamp.

14. The device defined by claim 13, wherein said operator carries indicia representing different levels of effective light intensity in terms of distance to a scene object to be illuminated.

15. The device defined by claim 13, wherein said operator comprises a wheel and wherein said device includes means to mount said wheel to rotate about an axis substantially orthogonal to a principal direction of light propagation from the device, and wherein said rotary-to-linear motion converting means includes a slider which is mounted for linear reciprocatory movement and which engages said sensing probe, said wheel having a projection on one face thereof which drives said slider.

16. The device defined by claim 15, wherein said projection acts on said slider such that the linear displacement of said slider is related to angular displacement of said wheel by substantially a cosine function.

17. The device defined by claim 16, wherein said wheel carries footage indicia indicating different levels of flash intensity in terms of distance to a scene object to be illuminated.

18. The device defined by claim 17, wherein said wheel defines a plurality of radially spaced recesses denoting predetermined index positions of said wheel, and wherein said device includes spring detent means for retentively engaging said recesses one at a time to hold said wheel in a selected one of said index positions.

* * * * *